United States Patent
Slane

[11] Patent Number: 5,907,712
[45] Date of Patent: May 25, 1999

[54] METHOD FOR REDUCING PROCESSOR INTERRUPT PROCESSING TIME BY TRANSFERRING PREDETERMINED INTERRUPT STATUS TO A SYSTEM MEMORY FOR ELIMINATING PIO READS FROM THE INTERRUPT HANDLER

[75] Inventor: Albert A. Slane, Oronoco, Minn.

[73] Assignee: International Business Machines Corporation, Armonk, N.Y.

[21] Appl. No.: 08/865,822

[22] Filed: May 30, 1997

[51] Int. Cl.$^6$ ........................................ G06F 9/46
[52] U.S. Cl. .......................... 395/742; 395/383; 395/842
[58] Field of Search ................... 395/733–742, 395/383, 842–848, 823–827

[56] References Cited

U.S. PATENT DOCUMENTS

| | | | |
|---|---|---|---|
| 4,709,324 | 11/1987 | Kloker | 395/383 |
| 5,261,107 | 11/1993 | Klim et al. | 395/725 |
| 5,301,277 | 4/1994 | Kanai | 395/681 |
| 5,446,869 | 8/1995 | Padgett et al. | 395/500 |
| 5,473,763 | 12/1995 | Stewart et al. | 395/375 |
| 5,495,615 | 2/1996 | Nizar et al. | 395/733 |
| 5,530,891 | 6/1996 | Gephardt | 395/800 |
| 5,548,730 | 8/1996 | Young et al. | 395/280 |
| 5,553,293 | 9/1996 | Andrews et al. | 395/734 |
| 5,555,420 | 9/1996 | Sarangdhar et al. | 395/739 |
| 5,555,430 | 9/1996 | Gephardt et al. | 395/800 |
| 5,613,153 | 3/1997 | Arimilli et al. | 395/821 |
| 5,671,365 | 9/1997 | Binford et al. | 395/280 |
| 5,708,813 | 1/1998 | Cho et al. | 395/733 |
| 5,724,609 | 3/1998 | Hatae et al. | 395/842 |
| 5,740,449 | 4/1998 | Densham et al. | 395/733 |
| 5,774,745 | 6/1998 | Ecclesinie | 395/872 |

OTHER PUBLICATIONS

IBM Technical Disclosure Bulletin, vol. 35, No. 4A, Sep. 1992, pp. 451–454, entitled "Milli–Code" by R. J. Bullions et al.

IBM Technical Disclosure Bulletin, vol. 24, No. 5, Oct. 1981, pp. 2303–2306, entitled "Programmable, Expandable Interrupt Controller" by J. M. Higdon et al.

*Primary Examiner*—Thomas C. Lee
*Assistant Examiner*—Harold J. Kim
*Attorney, Agent, or Firm*—Joan Pennington

[57] ABSTRACT

A method and apparatus are provided for reducing processor interrupt processing time in a data processing system. The data processing system includes a system processor, a system memory and an adapter coupled to the system processor and the system memory. The adapter checks for an interrupt condition. Responsive to identifying an interrupt condition, the adapter transfers predetermined interrupt status information to the system memory. Then the adapter raises an interrupt to the system processor. The adapter uses a direct memory access (DMA) descriptor or a source address and a destination address to move the predetermined interrupt status information to the system memory.

9 Claims, 4 Drawing Sheets

TIME

FIGURE 5
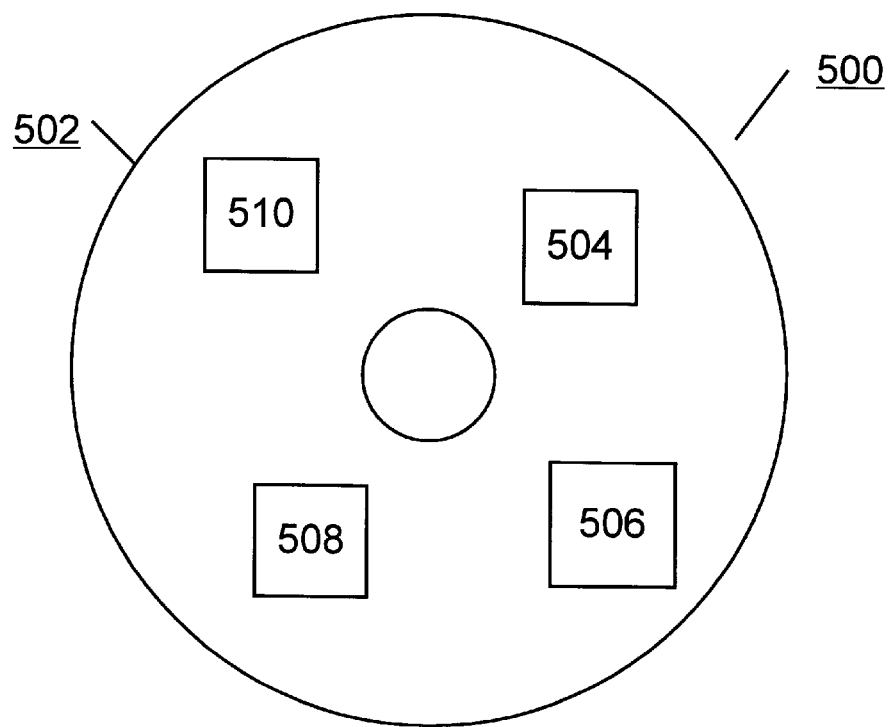
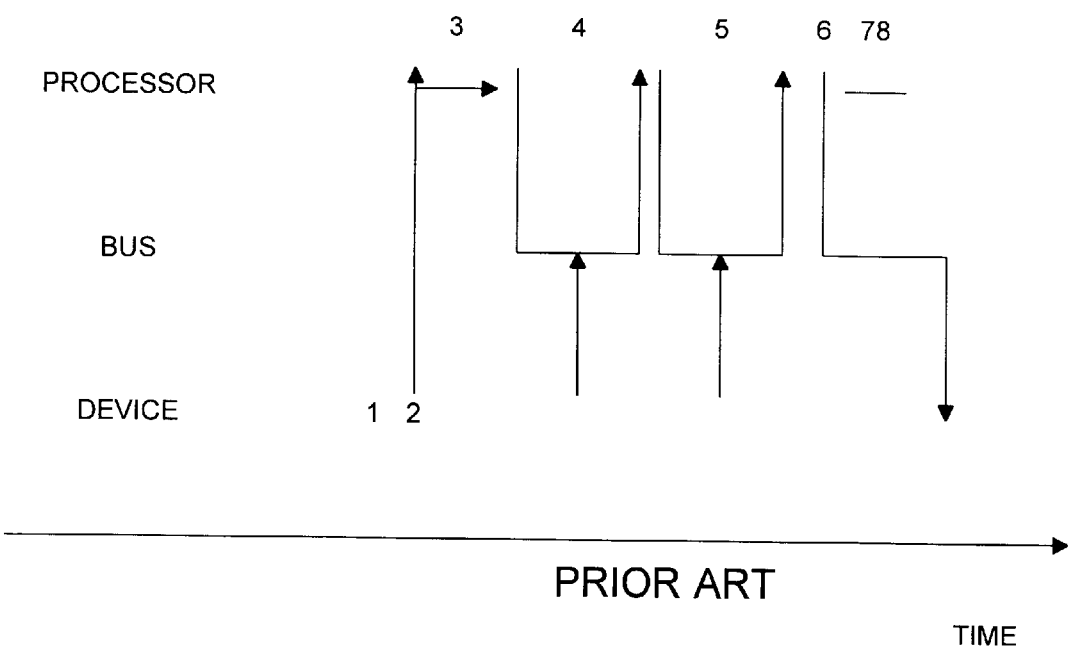
PRIOR ART
FIGURE 6

METHOD FOR REDUCING PROCESSOR INTERRUPT PROCESSING TIME BY TRANSFERRING PREDETERMINED INTERRUPT STATUS TO A SYSTEM MEMORY FOR ELIMINATING PIO READS FROM THE INTERRUPT HANDLER

FIELD OF THE INVENTION

The present invention relates generally to the data processing field, and more particularly, relates to a method and apparatus for reducing processor interrupt processing time in a data processing system.

DESCRIPTION OF THE PRIOR ART

As processors run faster, input/output (I/O) operations become a major part of interrupt latency as a result of the relatively slow operation of the I/O buses. For example, even on a peripheral component interconnect (PCI) bus running at 33 MHz, an average write can take about 180 ns to complete. This is assuming that the bus is not busy. If the bus is busy doing a direct memory access (DMA), the time can be much longer. For example, this time may be equivalent to 30–40 instructions or more on a fast processor using a cache. The times grow larger with tiered bus structures and distributed I/O.

Referring to FIG. 6, a timing chart illustrating a typical prior art scenario to process an interrupt is shown. In FIG. 6, a processor, bus, and a device are shown relative to the vertical axis and time is shown relative to the horizontal axis. As indicated at time 1, a condition occurs to cause an interrupt in the device. At time 2, an interrupt line is raised by the device. Some interrupt latency passes as indicated by time 3 before the interrupt is passed on to the correct interrupt handler. At time 4, the processor interrupt handler reads the status of one or more programmed I/Os (PIOs) from the device. At time 5, the handler acts on the status with one or more PIOs to read information from the device. At time 6, the handler resets the status with one or more PIO writes. At time 7, the handler passes information to an interrupt handling thread that runs at non-interrupt processing at task level. At time 8, the handler returns.

The above conventional scenario uses three or more PIO commands to handle a simple interrupt from the device. The last PIO write is not a large contributor to the overall interrupt processing time, because most adapters or bridges queue PIO writes and allow the processor to continue with other operations. Also more complex adapters typically require more PIOs. For example, an adapter having a tiered status structure may require two PIOs to determine what status needs to be handled.

One approach to reduce the number of PIOs to handle an interrupt uses thresholds and an interrupt is not raised until a set threshold is reached. For example, in one known adapter, a threshold is set for a number of frames on a receive queue before an interrupt is raised. By doing this, the status register is only read once for every threshold number of packets.

Another method of reducing the number of PIOs is to make the status self-clearing. Again one known adapter does this so once data is removed from the device, the interrupt line is dropped automatically. This does not provide a significant time reduction when the bridge queues PIO writes, but it does remove the bus time otherwise required to perform the write. Also, the interrupt controller still needs to be reset. Another condition that makes PIO reads worse is a busy bus. For example, if the bus is being utilized by a bus master to perform a DMA, a processor PIO read can be held off for long periods of time.

Even with these methods, the long PIO times severely restrict the performance that can be achieved for available high performance processor devices. What is needed is a way to reduce the processor interrupt processing time.

SUMMARY OF THE INVENTION

A principal object of the present invention is to provide an improved method and apparatus for reducing processor interrupt processing time in a data processing system. Other important objects of the present invention are to provide such method and apparatus substantially without negative effects and that overcome some disadvantages of prior art arrangements.

In brief, a method and apparatus are provided for reducing processor interrupt processing time in a data processing system. The data processing system includes a system processor, a system memory and an adapter coupled to the system processor and the system memory. The adapter checks for an interrupt condition. Responsive to identifying an interrupt condition, the adapter transfers predetermined interrupt status information to the system memory. Then the adapter raises an interrupt to the system processor.

In accordance with features of the invention, the adapter uses a direct memory access (DMA) descriptor or a source address and a destination address to move the predetermined interrupt status information to the system memory.

BRIEF DESCRIPTION OF THE DRAWING

The present invention together with the above and other objects and advantages may best be understood from the following detailed description of the preferred embodiments of the invention illustrated in the drawings, wherein:

FIG. 5 is a block diagram illustrating a computer program product in accordance with the invention; and FIG. 6 is a timing diagram illustrating a typical prior art scenario to process an interrupt.

DETAILED DESCRIPTION OF THE PREFERRED EMBODIMENTS

Figure 1:
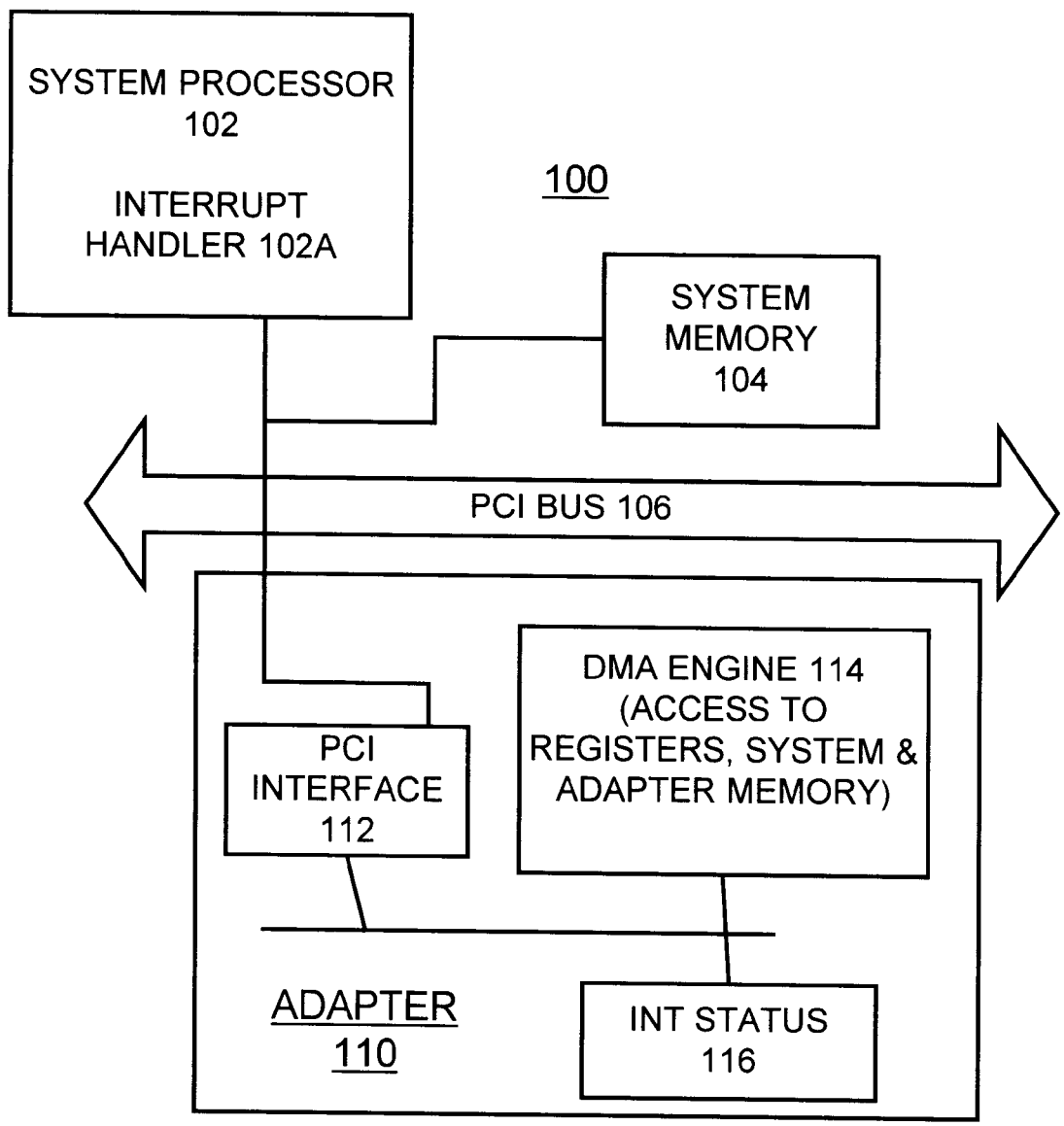
FIG. 1 is a block diagram representation of a data processing system including an adapter coupled to a system processor and a system memory via a peripheral component interconnect (PCI) bus of the preferred embodiment.

Having reference now to the drawings in FIG. 1, there is shown a data processing system generally designated by 100 and arranged in accordance with the preferred embodiment. System 100 includes a system processor 102 with an interrupt handler 102A, a system memory 104, a peripheral component interconnect (PCI) bus 106 and an adapter 110 arranged in accordance with the preferred embodiment. As shown in FIG. 1, adapter 110 includes a peripheral component interconnect (PCI) interface 112 coupled between the PCI bus 106 and a direct memory access (DMA) engine 114, and coupled to an interrupt (INT) status function 116. The DMA engine 114 controls access to system registers and system memory 104 and adapter memory (not shown) in the adapter 110. The INT status function 116 maintains status information for each interrupt raised to the system processor interrupt handler 102A so that interrupt information is not lost or overwritten. Adapter 110 is illustrated in simplified form sufficient for an understanding of the present invention.

In accordance with features of the invention, the interrupt processing time is reduced by eliminating PIO reads from the interrupt handler 102A of system processor 102. To remove the PIO time from the system processor interrupt handler 102A, either the PIOs need to be faster, or the PIO reads need to be removed from the system processor interrupt handler 102A entirely. Since the PIO times are limited by the IO bus, such as PCI bus 106, the present invention removes the PIO reads entirely from the system processor interrupt handler 102A by having adapter 110 do the work instead of the system processor interrupt handler 102A. The device adapter 110 does this work for the interrupt handler 102A by moving the interrupt status/packet information to the host memory 104 where the system processor interrupt handler 102A can access it as quickly as if it was any other memory access without accessing the PCI bus 106. The predetermined interrupt status information is moved to the system memory 104 before raising the interrupt line to the system processor 102.

Figure 2A:
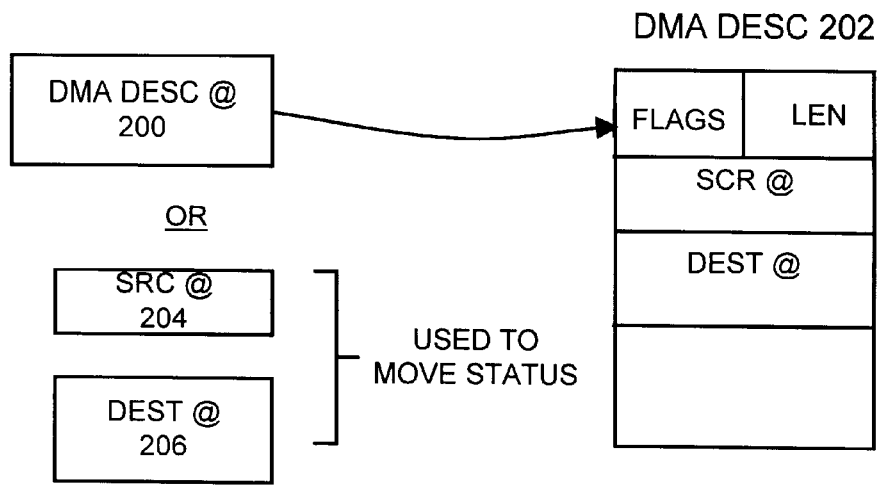
FIG. 2A is a diagram illustrating a direct memory access (DMA) descriptor, and alternative source address information and destination address information, used by the adapter of the preferred embodiment.

Referring to FIG. 2A, there is shown a direct memory access (DMA) descriptor address 200 pointing to a direct memory access (DMA) descriptor 202 used by the adapter 110 to move predetermined interrupt status information from the adapter 110 to the system memory 104. The DMA descriptor 202 includes flags, length (LEN), a source address (SRC) and a destination address (DEST). Alternatively setup information including a source address 204 and a destination address 206, can be used by the adapter 110 to move predetermined interrupt status information from the adapter 110 to the system memory 104. In adapter 110, the user is able to specify what to do on certain interrupts. For example, in the adapter 110 normal functional interrupts may include event information on a receive queue or a timer interrupt where the user can specify what to move to system memory 104 and where to move it, using for example, the DMA descriptors 202 or alternatively the source address 204 and the destination address 206, as shown. Other interrupts generally represent status or error conditions. In these cases, the user specifies that status be moved to the system memory 104, or that nothing is to be done, for example, for an error condition. Another advantage of providing this status function in the adapter 110 is that when a current device is doing a master DMA, the adapter 110 can stop the current DMA and move interrupt status information into the memory 104, and then resume the master DMA. This allows the interrupt latency to be improved as well as reducing interrupt processing time for the system processor 102.

Figure 2B:
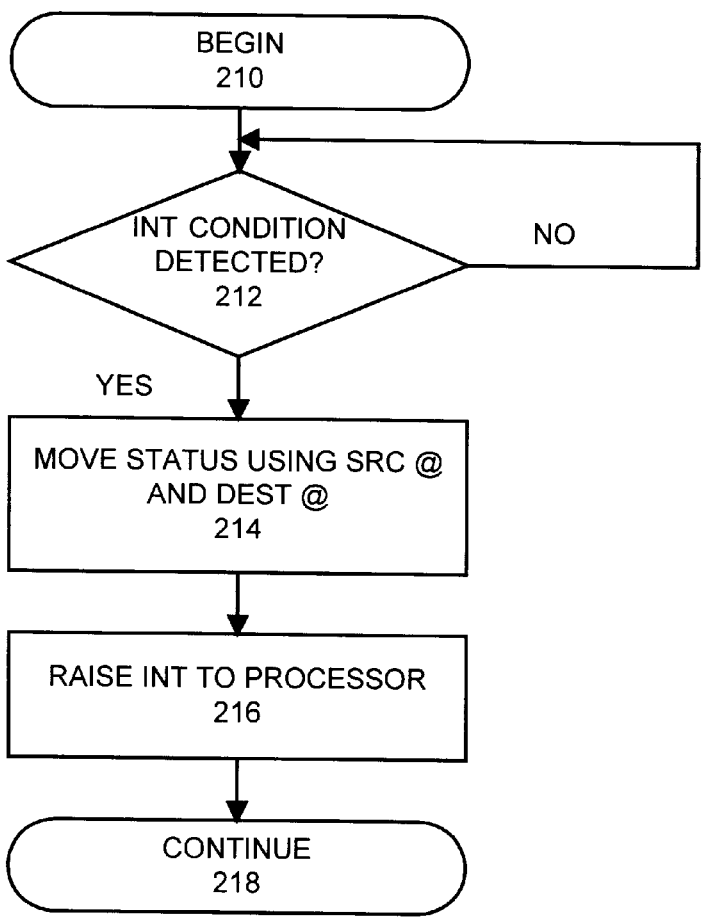
FIG. 2B is a flow chart illustrating sequential operations performed by the adapter of the preferred embodiment.

Referring to FIG. 2B, sequential operations performed by the adapter 110 of the preferred embodiment start at a block 210. Checking for an interrupt condition is performed by the DMA engine 114 of the adapter 110 as indicated at a decision block 212. When an interrupt condition is identified at decision block 212, then interrupt status information is moved to the system memory 104 using a source address and a destination address as indicated at a block 214 or alternatively using a DMA descriptor 202. Then an interrupt is raised to the system processor 102 as indicated at a block 216. Then the sequential operations continue as indicated at a block 218 with checking for an interrupt condition at decision block 212.

Figure 3:
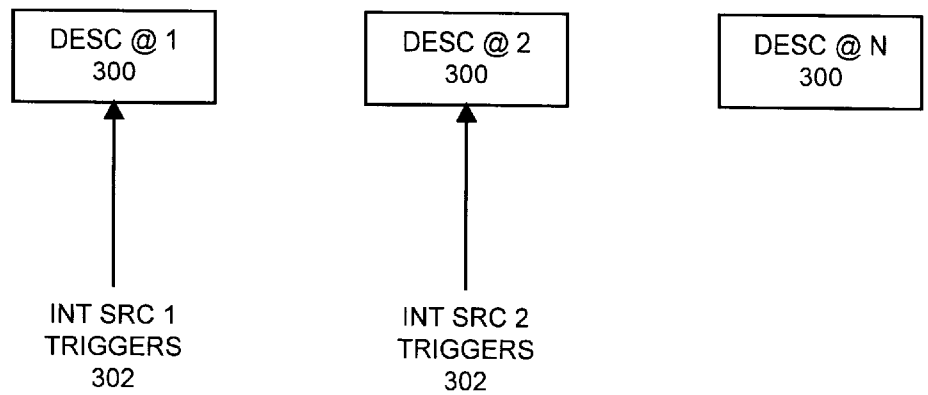
FIG. 3 is a diagram illustrating multiple interrupt source (SRC) triggers and multiple DMA descriptors used by the adapter of the preferred embodiment.

FIG. 3 illustrates multiple DMA descriptor addresses 300 pointed to by multiple interrupt source (SRC) triggers 302 that can used by the adapter 110 for various interrupt sources SRC 1, 2, as shown.

Figure 4:
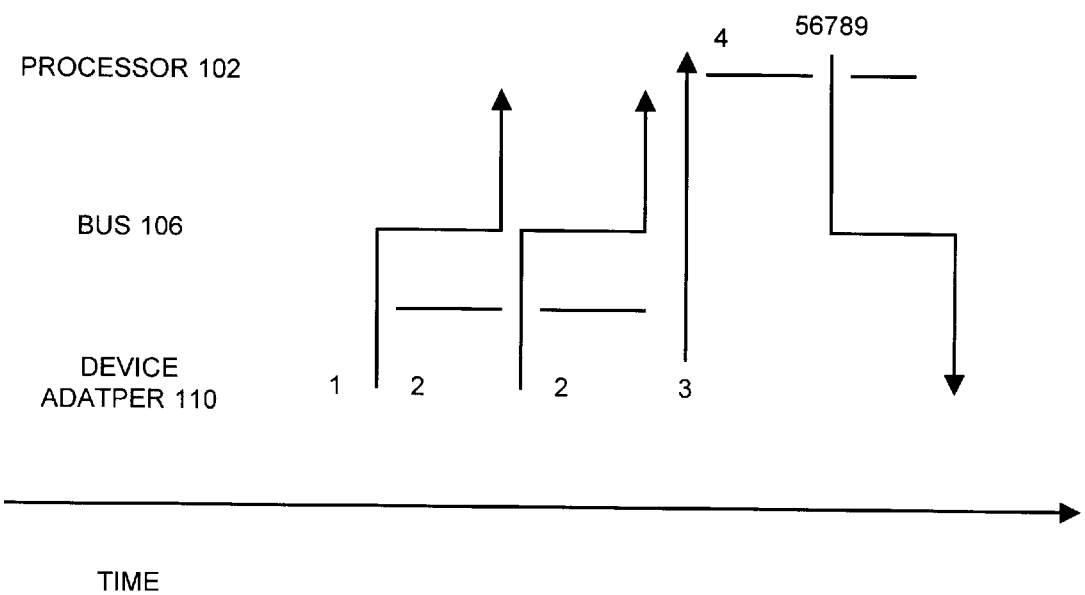
FIG. 4 is a timing diagram illustrating of sequential operations performed by the adapter and system processor in the data processing system of the preferred embodiment.

FIG. 4 is a timing diagram illustrating of sequential operations performed by the adapter 110 and processor 102 of the interrupt handling method of the invention. Referring now to FIGS. 2 and 4, operation of the adapter 110 in the data processing system 100 is shown. At time 1, an interrupt condition occurs as detected at decision block 212 of FIG. 2. At time 2, the DMA engine 114 of adapter 110 moves status and optionally other information to the system memory 104 as indicated at block 214 of FIG. 2. At time 3, an interrupt line is raised by adapter 110 as indicated at block 216 of FIG. 2. At time 4 after some interrupt latency passes before the interrupt is passed on to the correct interrupt handler 102A of system processor 102. Then as indicated at a time labeled 56789, first at time 5, the system processor interrupt handler 102A reads the status from the memory 104. At time 6, the system processor interrupt handler 102A acts on the status using device information in system memory 104. At time 7, the system processor interrupt handler 102A resets the status with one PIO write to synchronize the device adapter 110. At time 8, the system processor interrupt handler 102A passes information to an interrupt handling thread that runs at non-interrupt processing or task level. Once an interrupt is raised after interrupt status information has been moved to system memory 104, the same interrupt can not be raised until it is cleared by the processor 102 so information is not lost or overwritten. The system processor 102 must do a PIO write to synchronize the adapter 110 and the handler 102A before new information can be placed in memory 104. At time 9, the system processor 102 returns.

While the bus access time has not been reduced from the perspective of the PCI bus 106, the time is no longer charged against the system processor interrupt handler 102A, thus allowing the system processor 102 to do more useful work and reducing the processor interrupt processing time.

Referring now to FIG. 5, an article of manufacture or a computer program product 500 of the invention is illustrated. The computer program product 500 includes a recording medium 502, such as, a floppy disk, a high capacity read only memory in the form of an optically read compact disk or CD-ROM, a tape, a transmission type media such as a digital or analog communications link, or a similar computer program product. Recording medium 502 stores program means 504, 506, 508, 510 on the medium 502 for carrying out the methods for reducing processor interrupt processing time in the data processing system 100 of the preferred embodiment.

A sequence of program instructions or a logical assembly of one or more interrelated modules defined by the recorded program means 504, 506, 508, 510, direct adapter 110 for carrying out the interrupt status functions of the preferred embodiment.

While the present invention has been described with reference to the details of the embodiments of the invention shown in the drawing, these details are not intended to limit the scope of the invention as claimed in the appended claims.

What is claimed is:

1. A method for reducing processor interrupt processing time in a data processing system including a system processor with an interrupt handler and a system memory, said method performed by an adapter coupled to the system processor and the system memory, said method comprising the steps of:

checking for an interrupt condition;

responsive to identifying said interrupt condition, transferring predetermined interrupt status information to the system memory;

responsive to transferring said predetermined interrupt status information to the system memory, raising an interrupt to the system processor; and maintaining status information in the adapter for each said interrupt raised to the system processor; said status information being maintained until cleared by the system processor performing a programmed I/O (PIO) write to synchronize the adapter and the system processor interrupt handler, whereby interrupt status information is not overwritten to the system memory by the adapter.

2. A method for reducing processor interrupt processing time in a data processing system as recited in claim 1 wherein the step responsive to identifying an interrupt condition, of transferring predetermined interrupt status information to the system memory includes the step of utilizing a direct memory access (DMA) descriptor for transferring said predetermined interrupt status information to the system memory.

3. A method for reducing processor interrupt processing time in a data processing system as recited in claim 1 wherein the step responsive to identifying an interrupt condition, of transferring predetermined interrupt status information to the system memory includes the step of utilizing a source address and a destination address for transferring said predetermined interrupt status information to the system memory.

4. A computer program product for use with an adapter for reducing processor interrupt processing time in a data processing system including a system processor and a system memory coupled to the adapter, the computer program product comprising:

a recording medium;

means, recorded on said recording medium, for checking for an interrupt condition;

means, recorded on said recording medium, responsive to identifying an interrupt condition, for transferring predetermined interrupt status information to the system memory;

means, recorded on said recording medium, responsive to transferring said predetermined interrupt status information to the system memory, for raising an interrupt to the system processor; and means, recorded on said recording medium, for maintaining status information in the adapter for each said interrupt raised to the system processor; said status information being maintained until cleared by the system processor performing a programmed I/O (PIO) write to synchronize the adapter and the system processor interrupt handler, whereby interrupt status information is not overwritten to the system memory by the adapter.

5. A computer program product for use with an adapter for reducing processor interrupt processing time in a data processing system as recited in claim 4 wherein said means, recorded on said recording medium, responsive to identifying an interrupt condition, for transferring predetermined interrupt status information to the system memory includes means for utilizing a source address and a destination address for transferring said predetermined interrupt status information to the system memory.

6. A computer program product for use with an adapter for reducing processor interrupt processing time in a data processing system as recited in claim 4 wherein said means, recorded on said recording medium, responsive to identifying an interrupt condition, for transferring predetermined interrupt status information to the system memory includes means for utilizing a direct memory access (DMA) descriptor for transferring said predetermined interrupt status information to the system memory.

7. An adapter apparatus for reducing processor interrupt processing time in a data processing system including a system processor with an interrupt handler and a system memory connected to a system bus, said adapter apparatus comprising:

a bus interface coupled to the system bus;

a direct memory access (DMA) engine coupled to the bus interface for accessing said system memory, said DMA engine including means for checking for an interrupt condition;

means responsive to identifying an interrupt condition, for transferring predetermined interrupt status information to the system memory; and means responsive to transferring said predetermined interrupt status information to the system memory, for raising an interrupt to the system processor; and interrupt status function coupled to the DMA engine for maintaining status information for each said interrupt raised to the system processor; said status information being maintained until cleared by the system processor performing a programmed I/O (PIO) write to synchronize the adapter apparatus and the system processor interrupt handler, whereby interrupt status information is not overwritten to the system memory by the DMA engine.

8. An apparatus for reducing processor interrupt processing time in a data processing system as recited in claim 7 wherein said means responsive to identifying an interrupt condition, for transferring predetermined interrupt status information to the system memory includes means for utilizing a direct memory access (DMA) descriptor for transferring said predetermined interrupt status information to the system memory.

9. An apparatus for reducing processor interrupt processing time in a data processing system as recited in claim 7 wherein said means responsive to identifying an interrupt condition, for transferring predetermined interrupt status information to the system memory includes means for utilizing a source address and a destination address for transferring said predetermined interrupt status information to the system memory.

* * * * *